United States Patent
Keppeler

(10) Patent No.: US 7,586,291 B2
(45) Date of Patent: Sep. 8, 2009

(54) SYSTEM AND METHOD FOR CONTROLLING POWER OF A COMPUTER TERMINAL WITH AN EXTERNAL POWER SOURCE

(75) Inventor: Karl Edward Keppeler, Bellport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 517 days.

(21) Appl. No.: 11/095,836

(22) Filed: Mar. 31, 2005

(65) Prior Publication Data

US 2006/0220652 A1   Oct. 5, 2006

(51) Int. Cl.
*H02J 7/00* (2006.01)
*G06F 1/00* (2006.01)

(52) U.S. Cl. ........................... 320/133; 713/300

(58) Field of Classification Search ................. 320/133, 320/155, 104, 103, 134, 135, 136, 132, 149; 324/427, 378, 426, 430, 432, 433, 434; 307/10.1; 340/636.12, 636.13; 180/65.3; 701/22; 903/903, 903/904, 905, 906, 907, 908; 713/186, 300; 705/2; 318/139
See application file for complete search history.

(56) References Cited

U.S. PATENT DOCUMENTS

| | | | | |
|---|---|---|---|---|
| 4,950,913 A * | 8/1990 | Kephart | ..................... | 307/10.7 |
| 5,635,815 A * | 6/1997 | Whitchurch et al. | ........ | 320/131 |
| 6,037,744 A * | 3/2000 | Rhodes | ........................ | 320/104 |
| 6,426,606 B1 * | 7/2002 | Purkey | ........................ | 320/103 |
| 6,885,745 B1 * | 4/2005 | Handforth et al. | ........... | 379/412 |
| 6,936,995 B2 * | 8/2005 | Kapsokavathis et al. | .... | 320/132 |
| 7,176,658 B2 * | 2/2007 | Quazi et al. | ................... | 322/24 |
| 2005/0194933 A1 * | 9/2005 | Arnold et al. | ............... | 320/128 |
| 2005/0200201 A1 * | 9/2005 | Jabaji et al. | ................. | 307/10.1 |
| 2005/0280969 A1 * | 12/2005 | Reynolds | .................... | 361/93.1 |
| 2006/0112287 A1 * | 5/2006 | Paljug | ......................... | 713/300 |
| 2006/0145665 A1 * | 7/2006 | Zemke et al. | ................ | 320/133 |
| 2006/0181480 A1 * | 8/2006 | Yee | .............................. | 345/3.1 |

* cited by examiner

*Primary Examiner*—Akm E Ullah
*Assistant Examiner*—M'Baye Diao

(57) ABSTRACT

Described is system and method for controlling power of a computing terminal with an external power source. In particular, a voltage is measured within a system using a voltage detector of a computing terminal. The system includes a battery which provides power to the system and the terminal. When the measured voltage changes to a first level, a first procedure is initiated to monitor the voltage for a time period. Upon expiration of the time period, if the monitored voltage has not changed to a second level, a second procedure is initiated to power off the terminal.

23 Claims, 2 Drawing Sheets

SYSTEM AND METHOD FOR CONTROLLING POWER OF A COMPUTER TERMINAL WITH AN EXTERNAL POWER SOURCE

BACKGROUND

Within a warehouse and/or factory environment, many wireless computing terminals (e.g., a barcode scanner) may be performing various functions at a single time. For example, a user may utilize the scanner to scan barcodes of items within the warehouse. The scanner includes wireless communication capabilities so that data (e.g., product data from barcodes) is transmitted to and received from a central server and/or database over a radio channel. Other computing terminals within the warehouse may also communicate over the radio channel. For example, a vehicle radio computer ("VRC") is attached to a machine (e.g., a forklift). Similar to the scanner, the VRC includes a radio transceiver which allows an operator of the forklift to communicate with the server and/or database.

In a conventional system, the VRC is mounted onto the forklift and connects to a battery thereof. The forklift also includes an internal combustion engine and an alternator. Thus, when the engine is running, the battery is being recharged via the alternator. On the other hand, if the engine is off, the battery is not being charged, and the VRC typically draws a large amount of power therefrom. If the operator of the forklift does not power-off the VRC after the engine has been shut off, the VRC drains the battery. Without any charge remaining on the battery, the engine cannot start, and thus the battery cannot be recharged. Consequently, the VRC may not be turned on. This represents a significant cost to a proprietor of the warehouse/factory, because the forklift and the VRC are inoperable for a period of time.

One solution to this problem is to connect the VRC to an external relay box. When the operator turns the engine off, the relay box instantaneously cuts power to the VRC. Although the relay box prevents the VRC from draining the battery, other problems arise. For example, the operator typically shuts off the engine for only a short time (e.g., when temporarily leaving the forklift unmanned), and, as a result, the relay box cuts power to the VRC. Thus, only after restarting the engine, may the operator reboot the VRC and re-logon to the server. Furthermore, any applications of the VRC which were in the process of being executed may be interrupted, and/or any unsaved data may be lost. Thus, the proprietor of the warehouse/factory still faces a cost associated with a time taken by the operator to reboot the VRC and re-logon to the server.

SUMMARY OF THE INVENTION

The present invention relates to a method which includes measuring a voltage within a system by a voltage detector of a computing terminal. The system includes a battery providing power to the system and the terminal. When the measured voltage drops to a first level, a first procedure is initiated to monitor the voltage for a time period. Upon expiration of the time period, if the monitored voltage has not increased to a second level, a second procedure is initiated to power off the terminal.

DETAILED DESCRIPTION

Figure 1:
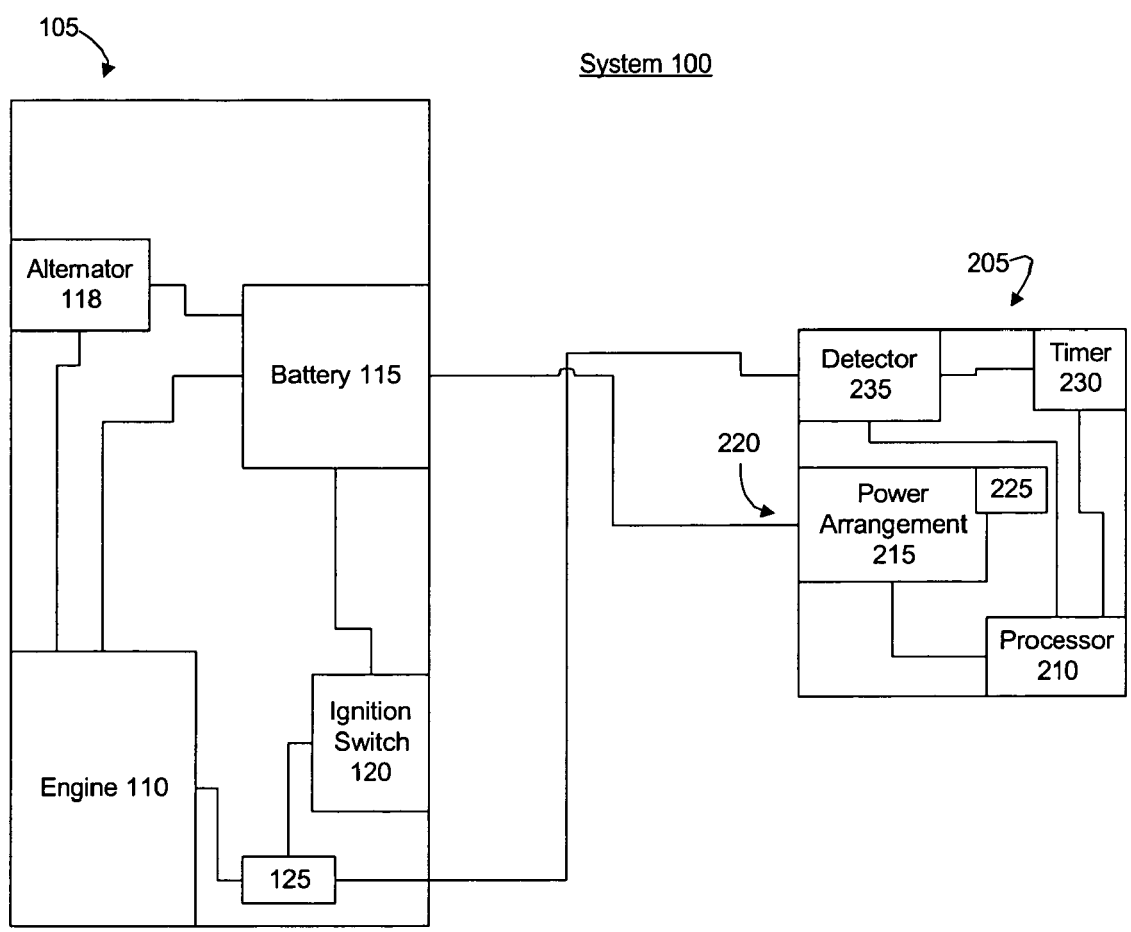
FIG. 1 shows an exemplary embodiment of a system according to the present invention.

The present invention may be further understood with reference to the following description and the appended drawings, wherein like elements are referred to with the same reference numerals. As shown in FIG. 1, an exemplary embodiment of a system 100 according to the present invention includes a host device/machine (e.g., a forklift 105) which is coupled to a wireless computing terminal (e.g., a VRC 205). Although the present invention will be described with respect to the forklift 105 and the VRC 205, those of skill in the art will understand that any devices, machines and/or terminals which share a power source may utilize the present invention. In particular, the present invention may be utilized by a parasitic device/terminal which is connected to and derives power from the power source of the host device/machine.

In FIG. 1, the forklift 105 includes an engine 110 (e.g., gas, oil, coal, etc.) connected to a battery 115 and an ignition switch 120. Igniting the engine 110 of the forklift 105 may be accomplished in a similar manner to that of a conventional automobile. For example, when an operator of the forklift 105 turns the ignition switch 120 in a first direction (an "On" state), fuel via a fuel source (e.g., gas tank) and power via the battery 115 are continuously provided to the engine 110. Then, a starter (e.g., button, switch, key) engages a starter motor to cause the engine 110 to begin running. When the operator turns the ignition switch 120 in a second direction (an "Off" state), the engine 110 may be shut down. As understood by those skilled in the art, the forklift 105 may further include an alternator 118 connected to the engine 110 and the battery 115. The engine 110 powers the alternator 118, which charges the battery 115 while the engine 110 is running. While in both the on and off states, one or more peripherals (e.g., lights, radio, etc.) may drain power from the battery 115. Thus, when the engine 110 is in the off state, the battery 115 is no longer being charged and is susceptible to a complete drain by the peripheral(s) which is not shut off. The forklift 105 further includes one or more elements (e.g., a switched power rail 125) which supplies power to one or more peripherals (e.g., headlights, radio, etc.) when the ignition switch is in the "On" state and removes power therefrom when the ignition switch is in the "Off" state.

The VRC 205 may be mounted on the forklift 105 by any conventional mechanism. For example, the VRC 205 may include a bracket (not shown) which may be fastened mechanically or chemically to the forklift 105. Preferably, the VRC 205 is mounted on the forklift 105 at a location which is easily accessible and viewable by the operator when the forklift 105 is being operated. For example, the VRC 205 may be mounted on or near a control panel or a cockpit of the forklift 105.

As shown in FIG. 1, the VRC 205 includes a processor 210 connected to a power arrangement 215. In one exemplary embodiment, the power arrangement 215 includes a lead 220 and a backup battery 225. The lead 220 is connected to the battery 115 of the forklift 105. Thus, the VRC 205 may continually draw power from the battery 115. The backup battery 225 (e.g., a NiMH battery) may provide power if the battery 115 of the forklift 115 becomes completely discharged. Preferably, the operator is notified when the VRC 205 is drawing power from the battery 115 and/or the backup battery 225. For example, if the operator has shut down the engine 110 but forgotten to shut down the VRC 205, the VRC 205 may completely discharge the battery 115. However, the VRC 205 may remain operational by drawing power from the backup battery 225. When the VRC 205 switches from the battery 115 to the backup battery 225, the operator is notified, via an output arrangement (not shown) (e.g., LED indicator, alarm, pop-up window) of the VRC 205.

The VRC 205 further includes a timer 230 which is connected to a voltage detector 235 and the processor 210. The timer 230 may be further connected to the power arrangement 215. Those of skill in the art will understand that the detector 235 may be connected to both the timer 230, the processor 210 and/or the power arrangement 215. According to the present invention, the detector 235 is connected to the rail 125 and detects at least the first and second voltage values thereon. Preferably, the connection to the rail 125 is robust, such that it may be maintained for all movements and actions of the forklift 105. The connection to the rail 125 may be a conducting wire which preferably includes an insulating sheath therearound. The sheath may be manufactured from any material which protects the wire from elements (e.g., weather, debris, dust, sparks, etc.) of an external environment.

Figure 2:
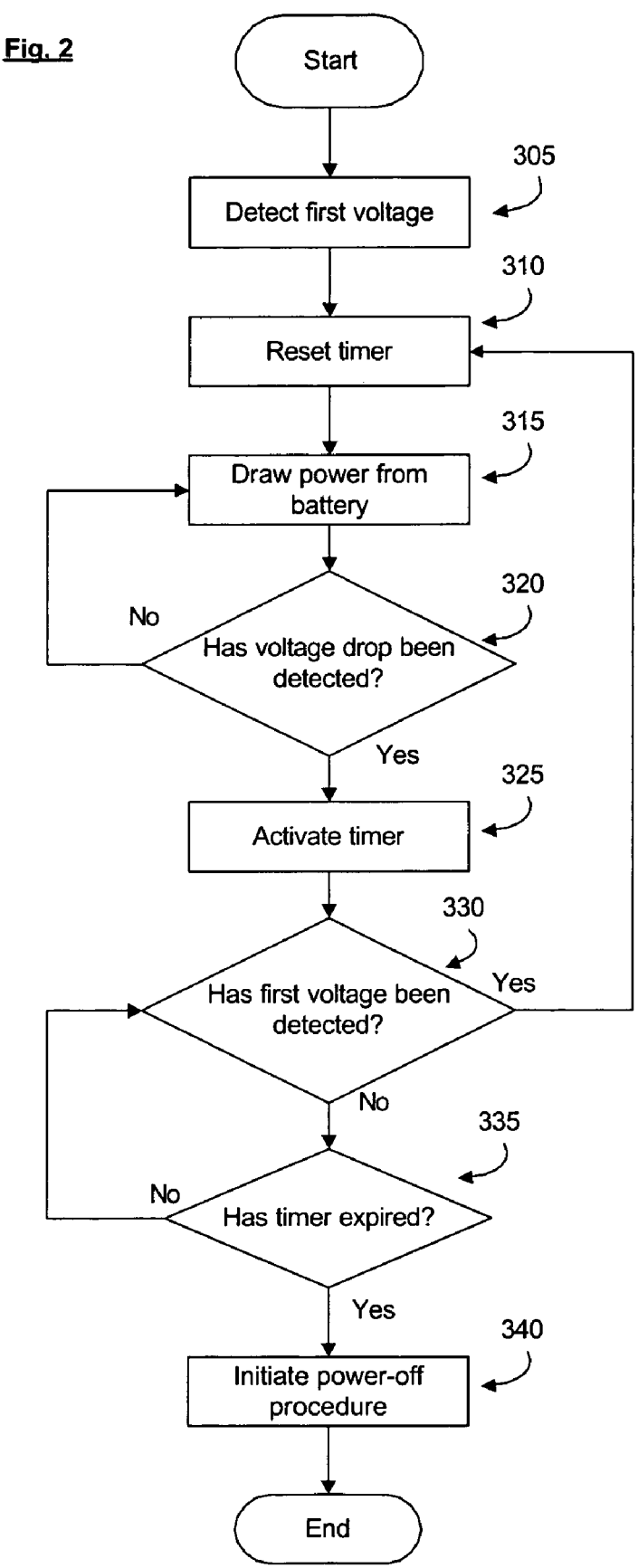
FIG. 2 shows an exemplary embodiment of a method according to the present invention.

Operation of the VRC 205 will be described with reference to an exemplary embodiment of a method 300 according to the present invention which is shown in FIG. 2. In operation, the operator may begin a shift (e.g., a predetermined time for which the forklift 105 will be used) by turning the ignition switch 120 to provide fuel and power to the engine 110 for running of the forklift 105. As described above, the starter engages the starter motor which starts the engine 110 running. While running, the engine 110 drives the alternator 118 which charges the battery 115.

In step 305, the VRC 205 detects the first voltage value at the rail 125 utilizing the detector 235. The detector 235 may detect for the first voltage value continuously or at predefined times (e.g., fixed intervals, upon powering-on, etc.). The first voltage value indicates to the VRC 205 that the engine 110 is running. In one exemplary embodiment, the VRC 205 draws power from the battery 115 until the VRC 205 has been manually or automatically powered off. That is, the VRC 205 draws power from the battery 115 regardless of a magnitude of the first voltage value. In this manner, the magnitude of the first voltage value may be relevant only to the extent that it is not zero. Thus, the detector 235 may not measure the magnitude of the first voltage value but simply determine an existence thereof. In this embodiment, the detector 235 may act as a switch moving between states based on the voltage value(s), or lack thereof, at the rail 125. The processor 210 may detect a change in the state of the detector 235. However, if the magnitude of the first voltage value is obtained by the detector 235, the VRC 205 may store the first voltage value for reasons which will be described below.

In another exemplary embodiment, upon detection of the first voltage value, the VRC 205 ceases drawing power from the backup battery 225 and begins drawing power from the battery 115 of the forklift 105. For example, the backup battery 225 may sustain power to the VRC 205 while it is not being used and/or the engine 110 is not running. When the first voltage value is detected, the VRC 205 draws power from the battery 115.

In step 310, the VRC 205 resets the timer 230. The timer 230 may be initialized with a predetermined time period set by the operator or pre-packaged with software executed by the processor 210. The predetermined time period may be changed based on an amount of time for which the operator temporarily leaves the forklift 105 and shuts off the engine 110. For example, after the operator drives the forklift 105 to a loading dock and loads items onto a delivery truck, he may temporarily leave the forklift 105 to sign an invoice and/or aid in packing the items in the truck. The operator may routinely perform this activity, and, as such, may set the predetermined time period to a quantity slightly greater than the amount of time required therefore. Thus, if the activity routinely takes ten minutes, the predetermined time period may be set to fifteen minutes. In this embodiment, while the VRC 205 has detected the first voltage value (e.g., the engine 110 is running), the timer is maintained at the predetermined time period. The significance of the predetermined time period will be explained more fully below.

In step 315, the VRC 205 draws power from the battery 115 of the forklift 105. In the embodiment where the VRC 205 includes the backup battery 225 and the first voltage value has been detected, the VRC 205 draws power only from the battery 115. As understood by those skill in the art, the VRC 205 may draw enough power to execute any application loaded thereon. Furthermore, the VRC 205 may draw additional power to charge the backup battery 225. As understood by those of skill in the art, the timer 230 may be reset and the VRC 205 may begin drawing power from the battery 115 simultaneously.

In step 320, the VRC 205 determines whether a predetermined voltage change (e.g., a voltage drop) has occurred at the rail 125. As described above, the detector 235 may detect the voltage value(s) at the rail 125 while the VRC 205 remains powered. The voltage drop may occur when the first voltage value at the rail 125 decreases to a second voltage value. The voltage drop happens if, for example, the operator shuts off the engine 110 by turning the ignition switch 120. A magnitude of the second voltage value may be zero or a negligible amount, either of which signifies to the VRC 205 that the engine 110 is no longer running. As understood by those of skill in the art, the predetermined voltage drop is an exemplary embodiment of any change in the first voltage value which indicates that the engine 110 is no longer running. If the voltage drop has not been detected (i.e., detector 235 detects the first voltage), the VRC 205 continues drawing power from the battery 115.

In step 325, the VRC 205 activates the timer 230 having the predetermined time period beginning at an initial value and expiring at a final value. As understood by those of skill in the art, the timer 230 may decrement from the initial value to zero, or may increment from zero to the final value. The timer 230 may be activated by the detector 235 or the processor 210. That is, upon detection of the voltage drop, the detector 235 may activate the timer 230. Or, the detector 235 may notify the processor 235 of the voltage drop and the processor 210 may activate the timer 230.

In step 330, the VRC 205 determines whether the first voltage value has been detected at the rail 125. While the timer 230 is decrementing, the operator may have turned the engine 110 back on. For example, at the loading dock, the operator may have turned off the engine 110 and left the forklift 105 to assist loading the items into the delivery truck. When the operator turned off the engine 110, the timer 230 was activated. Thus, the VRC 205 maintained drawing power from the battery 115. However, because the predetermined time period of the timer 230 was set at fifteen minutes, the operator finished loading the items and restarted the engine 110 after, for example, only ten minutes. Thus, the VRC 205 remains powered without interrupting applications executing thereon or losing data, and the operator remains logged on to the server. Because, the VRC 205 remained connected to the server, the VRC 205 is capable of receiving wireless signals (e.g., instructions for subsequent tasks for the operator) from the server. If the first voltage value is detected (e.g., the engine 110 is running again), then the VRC 205 resets the timer 230 and continues drawing power from the battery 115.

In step 335, because the first voltage value has not been detected, the VRC 205 determines whether the predetermined time period on the timer 230 has expired. If the predetermined time period has not expired, the timer 230 continues to decrement the predetermined time period, the VRC 205 continues drawing power from the battery 115 and continues detecting for the first voltage value at the rail 125. In step 340, the predetermined time period has expired, and, thus, the VRC 205 initiates a power-off procedure. That is, the VRC 205 ceases drawing power from the battery 115. As noted above, the VRC 205 may switch to the backup battery 225 or may shut down completely (i.e., cease drawing power from the battery 115 and/or the battery backup battery 225).

In one exemplary embodiment of the present invention, a display (e.g., LCD) of the VRC 205 shows the operator the predetermined time period. Thus, the operator is aware of a remaining time for which the VRC 205 is powered. In this manner, the VRC 205 may temporarily or permanently extend the predetermined time period after receiving an indication from the operator and/or the server that the VRC 205 should remain powered. For example, if the operator is transmitting data to the server when the predetermined time period is about to expire, the operator may indicate (e.g., press a button/portion of screen, etc.) that the VRC 205 must maintain power. The VRC 205 may then augment the remaining portion of the predetermined time period with a predetermined value which is, for example, chosen from increments (e.g., one minute, 10 minutes, etc.) or entered by the operator/server. The server may instruct the VRC 205 to remain powered in a similar situation. That is, the server may interrupt the data transmission from/to the VRC 205 to transmit an instruction to extend the predetermined time period. The operator may override the instruction from the server if, for example, the display of the VRC 205 shows that the battery 115 is almost completely discharged and any further draw therefrom would cause full discharge. The operator and/or server may further instruct the VRC 205 to power-off before the timer 230 has expired.

Although the present invention has been described with respect to the voltage detector 235 detecting the voltage at the rail 125, another exemplary embodiment may include a mechanical detection mechanism to determine whether the engine 110 is running. For example, one or more limit switches and/or enclosed switches may be disposed at the ignition switch 120. Thus, when the operator turns a key, flips a switch or presses a button, contact with the limit switch may indicate to the VRC 205 whether the engine 110 is running. Also, the detector 235 may detect a change in a current within the forklift 105. For example, the detector 235 may be connected to a component of the forklift 105 which connects the alternator 118 to the battery 115, and, when the engine 110 is running, the current is passing through the component.

Furthermore, although the present invention has been described with respect to the forklift 105 and the VRC 205, the system 100 and method 300 may be utilized by further systems. For example, the present invention may be utilized by any device which draws power from a vehicle with an internal combustion engine. In one embodiment, a cradle for charging a battery of a handheld computer (e.g., cell phone, PDA, scanner, etc.) may draw power from the battery of the vehicle. The cradle may further power a non-computing device (e.g., a flashlight). In another embodiment, a vehicle-mounted peripheral (e.g., RFID reader) and/or a battery thereof may draw power from the battery of the vehicle. Thus, as described above, the present invention may be utilized by a parasitic device which derives power from the power source of the host device.

In yet a further embodiment, the present invention may be utilized by a battery-powered vehicle that does not require a natural fuel (e.g., gasoline, oil, coal). For example, the forklift 105 may include a motor which is powered by a rechargeable battery (e.g., 24 V DC battery). In this embodiment, the detector 235 may detect a voltage increase when the forklift 105 shut off. For example, an active load (e.g., powering forklift 105 and the VRC 205) on the rechargeable battery will be greater than a rest load (e.g., only powering the VRC 205). Thus, the VRC 205 may detect a voltage increase when the forklift 105 is shut off. The detection of the voltage increase may start the timer 230.

Although FIG. 1 shows an exemplary embodiment of an architecture of the VRC 205, those of skill in the art will understand that other configurations may be utilized. For example, in one embodiment, the detector 235, via a direct connection, notifies the power arrangement 215 of when to begin drawing power from the battery 115. In another embodiment, the timer 230, via a further direct connection, notifies the power arrangement 215 of when to cease drawing power from the battery 115. In yet a further embodiment, the timer 230 is implemented as a software application executed by the processor 210. Thus, the timer 230 is not a stand-alone element of the VRC 205.

It will be apparent to those skilled in the art that various modifications may be made in the present invention, without departing from the spirit or scope of the invention. Thus, it is intended that the present invention covers the modifications and variations of this invention provided they come within the scope of the appended claims and their equivalents.

What is claimed is:

1. A method, comprising:
   (a) measuring a voltage within a system by a voltage detector of a computing terminal, the system including a battery providing power to the system and the terminal;
   (b) when the measured voltage drops to a first level, initiating a first procedure to monitor the voltage for a time period; and
   (c) upon expiration of the time period, if the monitored voltage has not increased to a second level, initiating a second procedure to power off the terminal.

2. The method of claim 1, wherein the first procedure includes notifying a user of the change of the measured voltage.

3. The method of claim 1, wherein the step (b) includes the following sub steps:
   continuously measuring the voltage by the detector; and
   upon detection of the drop of the monitored voltage to the second level, terminating the first procedure.

4. The method of claim 1, further comprising:
   before step (a), setting the time period to a predetermined value.

5. The method of claim 1, wherein the second procedure includes discontinuing drawing power from the battery.

6. The method of claim 1, wherein the step (c) includes the following substeps:
   detecting whether the terminal is executing at least one of a plurality of predetermined applications;
   discontinuing drawing power from the battery after the at least one application is executed.

7. The method of claim 1, wherein the system includes an alternator and an internal combustion engine, the alternator recharging the battery while the engine is working.

8. The method of claim 1, further comprising:
augmenting the time period in response to an instruction from one of a user of the terminal and a server connected to the terminal.

9. The method of claim 1, wherein the terminal includes a further battery providing power to the terminal when the terminal is not drawing power from the battery.

10. A system, comprising:
a machine including a battery; and
a computing terminal connected to the machine to obtain power from the battery, the terminal including a processor and a voltage detector which measure a voltage of the machine,
wherein, when a drop of the measured voltage to a first level is detected by the detector, the processor initiates a first procedure to monitor the voltage for a time period, and
wherein upon expiration of the time period, if the monitored voltage has not increased to a second level, the processor initiates a second procedure to power off the terminal.

11. The system of claim 10, wherein the machine includes an alternator and an internal combustion engine, the alternator recharging the battery when the engine is working.

12. The system of claim 10, wherein the computing terminal is a vehicle radio computer.

13. The system of claim 10, wherein the terminal notifies a user thereof of the change of the measured voltage.

14. The system of claim 10, wherein the detector continuously measures the voltage after the voltage drop is detected.

15. The system of claim 10, wherein the first procedure is terminated after the increase of the measured voltage to the second level is detected.

16. The system of claim 10, wherein the terminal includes a further battery providing power to the terminal when the terminal is not drawing power from the battery.

17. A computing terminal, comprising:
a voltage detector measuring a voltage of a machine, the machine including a battery;
a power arrangement connected to the battery to obtain a power for the terminal; and
a processor connected to the detector and the power arrangement,
wherein, when a drop of the measured voltage to a first level is detected by the detector, the processor initiates a first procedure to monitor the voltage for a time period, and
wherein upon expiration of the time period, if the monitored voltage has not increased to a second level, the processor initiates a second procedure to power off the terminal.

18. The terminal of claim 17, wherein the terminal includes a further battery providing power to the terminal when the terminal is not drawing power from the battery.

19. The terminal of claim 17, wherein the terminal notifies a user thereof of the drop of the measured voltage.

20. The terminal of claim 17, wherein the processor terminates the first procedure and resets the time period upon detection of the increase of the measured voltage to the second level.

21. The terminal of claim 17, further including:
a timer connected to at least one of the detector and the processor, the timer being set to a predetermined value.

22. The terminal of claim 17, wherein the terminal is a vehicle radio computer.

23. The terminal of claim 17, wherein the second level is greater than the first level.

* * * * *

UNITED STATES PATENT AND TRADEMARK OFFICE
CERTIFICATE OF CORRECTION

PATENT NO. : 7,586,291 B2  Page 1 of 1
APPLICATION NO. : 11/095836
DATED : September 8, 2009
INVENTOR(S) : Keppeler It is certified that error appears in the above-identified patent and that said Letters Patent is hereby corrected as shown below:

In Column 6, Line 50, in Claim 3, delete "sub steps:" and insert -- substeps: --, therefor.
   (AMENDMENTS TO THE CLAIMS DATED JANUARY 20, 2009, PAGE 2, CLAIM 3, LINE 2)

Signed and Sealed this

Ninth Day of February, 2010

David J. Kappos
*Director of the United States Patent and Trademark Office*